Dec. 4, 1934.  E. A. THOMPSON  1,982,769
CLUTCH MECHANISM FOR TRANSMISSIONS
Filed April 25, 1927  3 Sheets-Sheet 1

Inventor:
Earl A. Thompson
By
Melans & Melans
Attorneys

Dec. 4, 1934. E. A. THOMPSON 1,982,769
CLUTCH MECHANISM FOR TRANSMISSIONS
Filed April 25, 1927  3 Sheets-Sheet 2
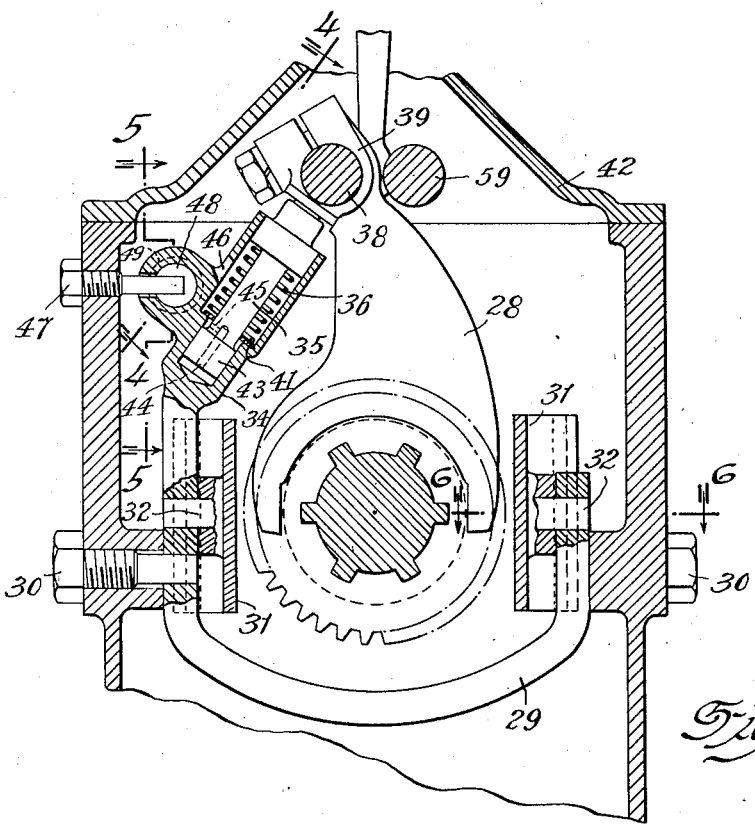
Fig.3
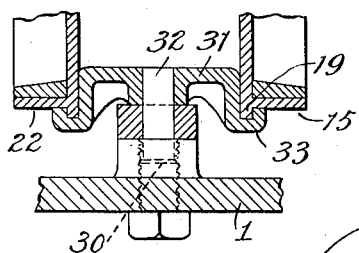
Fig.6
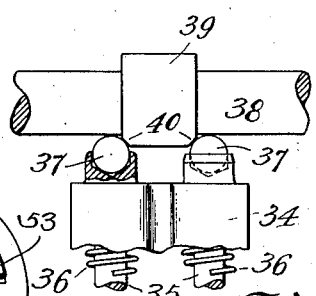
Fig.4
Fig.8.
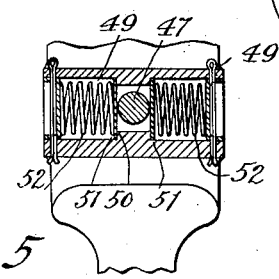
Fig.5
Inventor:
Earl A. Thompson
By
Milans & Milans
Attorneys.

Dec. 4, 1934.  E. A. THOMPSON  1,982,769
CLUTCH MECHANISM FOR TRANSMISSIONS
Filed April 25, 1927  3 Sheets-Sheet 3
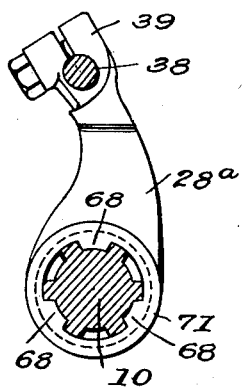
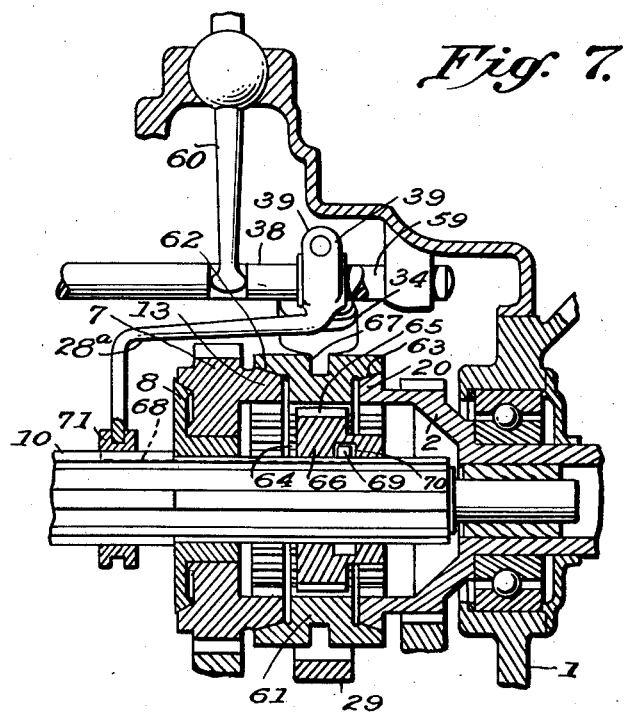
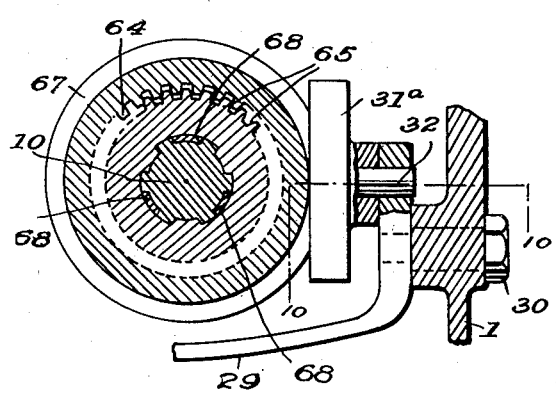
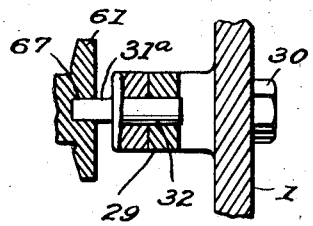
Inventor
Earl A Thompson.
By Milans & Milans
Attorneys Patented Dec. 4, 1934

1,982,769

UNITED STATES PATENT OFFICE 1,982,769

CLUTCH MECHANISM FOR TRANSMISSIONS

Earl A. Thompson, Detroit, Mich., assignor to General Motors Corporation, Detroit, Mich., a corporation of Delaware Application April 25, 1927, Serial No. 186,454

22 Claims. (Cl. 192—53)

My invention relates to new and useful improvements in synchronized power transmissions and in so far as the subject matter is common is a continuation of my application filed August 2, 1926, Serial No. 126,639, which has resulted in Patent No. 1,854,281, dated April 19, 1932.

The principal object of the present invention resides in the provision of a more powerful synchronizing device than has previously been provided and the designing of positive clutching members, for positively connecting the drive to the spline shaft in such a manner as to permit conical clutches of relatively large diameter to be used, a double cone clutch being used in connection with the second speed gear so that the pressure applied to one of the conical clutches is also applied to the other.

A further object of the invention resides in the provision of means associated with a single yoke for controlling the synchronizing clutches of both high and intermediate speeds.

With the above and other objects in view, which will appear as the description proceeds, my invention consists in the novel details of construction and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 3 is a transverse vertical section with parts shown in elevation.

Fig. 4 is a fragmental detail on the line 4—4 of Fig. 3 looking in the direction of the arrows.

Fig. 5 is a section on the line 5—5 of Fig. 3 looking in the direction of the arrows.

Fig. 6 is a section on the line 6—6 of Fig. 3 looking in the direction of the arrows;

Fig. 7 is a fragmental detail, partly in longitudinal vertical section and part in side elevation, illustrating a slightly modified form of my invention;

Fig. 8 is a detail showing in elevation the spring for normally pressing the drums towards each other.

Fig. 9 is a detail partly in vertical section and partly in elevation showing the arrangement of yoke and thrust block used in connection with the friction member shown in Fig. 7.

Fig. 10 is a horizontal section on the line 10—10 of Fig. 9; and

Fig. 11 is a detail showing the shifter fork for shifting the jaw clutch element as viewed from the left of Fig. 7.

Figure 1:
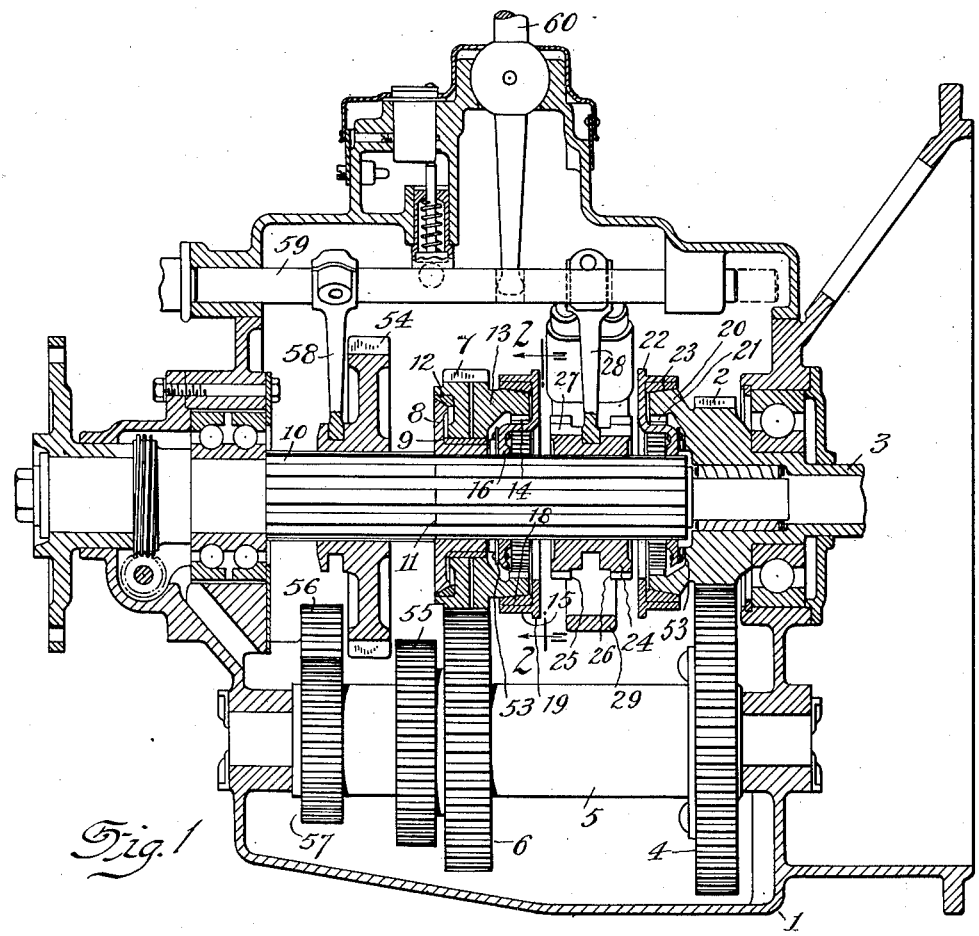
Fig. 1 is a longitudinal vertical section through the transmission with parts shown in side elevation.

In the drawings, in which is illustrated a transmission of conventional form and design except for the arrangement of the gearing and synchronizing clutches on the high and intermediate speeds, 1 indicates the transmission case or housing and 2 the driving or clutch gear which is driven from the engine by the shaft 3, the gear 2 as usual being in constant mesh with the gear 4 which drives the counter shaft 5 having the usual gear cluster thereon from which is obtained the various speeds in the usual manner. The gear 6 of the gear cluster is in constant mesh with the gear 7 which is normally free to revolve on the member 8, a bronze bushing 9 being provided on the sleeve portion of the member 8 to minimize friction and wear between the gear 7 and the member 8. The member 8 is splined and mounted on the spline shaft 10 to turn therewith and is held against endwise movement in a direction towards the left in Fig. 1 by the shoulder 11 formed by the different diameters of the shaft 10. The outer periphery of the flange portion of the member 8 is conical in form and is adapted to engage with a similar conical surface formed interiorly of the bushing 12 which is secured to and carried by the gear 7. The gear 7 has on its opposite face the extension or hub 13, the outer surface of which is conical in form. The teeth 14 are formed interiorly of the hub 13. A drum 15 of the construction more particularly illustrated in Fig. 2 of the drawings is carried by and driven by the shaft 10, this drum being formed with the spokes 16 to provide openings 17 therebetween for a purpose to be later described. A conical bushing 18 is secured within the periphery of the drum 15 to engage the external conical surface of the hub 13 and a flange 19 extends around the outer periphery of the drum 15 as shown more particularly in Figs. 1, 2 and 6, for a purpose which will later appear.

Formed on the gear 2 is the conical hub or extension 20 having the internal teeth 21, this hub or extension 20 being similar to the hub 13 formed on the gear 7. A drum 22 similar to the drum 15 is driven from the shaft 10 and carries the bushing 23 adapted to engage the outer conical surface of the hub 20. As the construction and operation of the drum 22 is similar to that of the drum 15 a further detailed description thereof is not thought necessary, it being understood that this drum is also formed with the spokes and spaces therebetween.

A coupling member is shown at 24 and is mounted upon the shaft 10 for longitudinal sliding movement thereon. This coupling member 24 is provided with the exterior teeth 25 and 26, the teeth 26 being adapted for engagement with the internal teeth 21 of the hub 20 when shifted to the right in Fig. 1 and the teeth 25 being engaged with the teeth 14 of the hub 13, when moved to the left of Fig. 1 for the purpose of locking either the gear 7 or 2 to the spline shaft 10 to be driven therewith. The coupling member 24 is also provided in its outer periphery with the recesses 27 shown more particularly in Figs. 1 and 2 of the drawings. The purpose of these recesses is to provide clearance for the spokes 16 in the drums 15 and 22 when the coupling member 24 is shifted into engagement with either the teeth 14 or the teeth 21 in the manner previously described. In Fig. 2 of the drawings the coupling member 24 is shown in dotted lines so as to illustrate how the recesses 27 provide clearance for the spokes 16 of the drums 15 and 22. The drums 15 and 22 and the coupling member 24 are driven by, and always turn with, the shaft 10 so that the recesses 27 in the coupling member will always register with the spokes 16 of the drums. The coupling member 24 is shifted by means of the shifter fork 28 in the usual manner.

A yoke 29 is mounted on the pivot pins 30 on opposite sides of the transmission case or housing 1 and carries the thrust blocks 31 which are mounted on the pivot pins 32. This arrangement and construction of the yoke and its associated parts is shown more particularly in Figs. 3, 4, 5 and 6 of the drawings. The thrust blocks 31 are provided with the grooves 33 into which fit the flanges 19 on the drums 15 and 22, this being more clearly illustrated in Fig. 6 of the drawings. This construction and arrangement allows for the retracting of the drums as the yoke returns to normal position after operation in a manner to be later brought out.

The upper arm or lever 34 of the yoke 29 is enlarged to receive a pair of releasable latches in the form of plungers 35 which are normally pressed upwardly by means of the coiled springs 36, the releasing movement of the plungers being retarded by a fluid friction brake or dashpot. Received within recesses in the upper ends of the plungers 35 are the balls 37 which bear against the shifter rod 38 which carries the shifter fork 28. The hub 39 of the shifter fork 28 is formed with the beveled edges as shown at 40 and the balls 37 are adapted to bear against these beveled edges for the purpose of rocking the yoke 29 as the shifter rod 38 is moved from neutral position. A small U-shaped washer 41 is slipped over the plunger 35 to retain the spring 36 so that the plunger will not be thrown out when the cover 42 of the housing or casing 1 is removed.

The piston portion 43 of the plungers 35 has a hole 44 drilled from the end upwardly into the reduced body portion and a small hole 45 is drilled through the side and intersects the hole 44. The size of the hole 45 may be varied to govern the retarding action of the plungers. Transmission oil is fed to each of the plungers through the openings 46. The yoke member 29 is normally held in its neutral position by means of the stop screw 47, the inner end of which projects through a horizontally elongated recess into the chamber 48 formed on the side of the upper enlarged portion of the yoke which contains the plungers. The chamber 48 is enlarged as at 49 on opposite sides of the portion of the stop screw 47 which projects into the chamber to provide the shoulders 50 against which the discs 51 are pressed by means of the coiled springs 52 so that when the yoke is rocked in either direction it will be returned to its neutral position by one or the other of the coiled springs 52 according to the direction it is moved.

Figure 2:
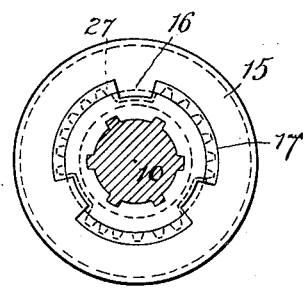
Fig. 2 is a section on the line 2—2 of Fig. 1 looking in the direction of the arrows.

The drums 15 and 22 are normally pressed towards each other by means of the small leaf springs 53 secured to the inner hubs of the drums as shown more particularly in Fig. 1 of the drawings, the detail construction of these springs being shown in Fig. 8.

A gear 54 is slidably mounted on the shaft 10 and when moved to the right of the position shown in Fig. 1 will mesh with the gear 55 of the gear cluster on the counter shaft 5 to provide "low gear". When moved to the left, from its neutral position, shown in Fig. 1, the gear 54 will mesh with the reverse idler gear 56 which in turn meshes with the gear 57 of the gear cluster on the countershaft to provide "reverse gear". The gear 54 is operated by the shifter fork 58 carried by the shifter rod 59. The shifter rods 38 and 59 are operated in the usual manner from the shift lever 60.

From the above detailed description it is thought that the construction will be clearly understood and I will now endeavor to more clearly bring out the operation. In the drawings the parts are shown in their neutral positions and when it is desired to shift into second speed the shift lever 60 will be moved so that the shifter rod 38 and shifter fork 28 will be moved to the left of Fig. 1. When this is done the yoke 29 is rocked about its axis by means of the ball 37 carried by one of the plungers 35 engaging with one of the beveled edges 40. With the fulcrum point 32 of the thrust blocks 31 spaced slightly above the axis 30 of the yoke 29 the movement of the upper end of the yoke to the left will press the drum 15 to the left and force the conical friction surfaces of the bushing 18 and the hub 13 into tight frictional engagement and at the same time with equal pressure will also force the conical friction surface of the bushing 12 and the member 8 into tight frictional engagement. The member 8 being held against endwise movement by the shoulder 11 on the shaft 10 will not yield during the operation described. The operation up to this point will frictionally connect the gear 7 to drive with the shaft 10 in view of the fact that both the member 8 and the drum 15 are driven by the shaft. This will cause the internal teeth 14 and the teeth 25 on the coupling member 24 to revolve at the same speed and then upon further movement of the shifter rod 38 to the left the spring 36 will be depressed to allow the ball carried by the plunger 35 to pass out of engagement with the beveled surface 40. When this is done the spring 52 which has been compressed by the rocking of the yoke will return the yoke to its neutral position and the drum 15 will be drawn to the right by the engagement of the thrust block 31 with the flange 19 as shown in Fig. 6 so that if the conical surface of the bushing 18 and the hub 13 should stick, and the internal teeth 14 and teeth 25 of the coupling member do not register the coupling member can then, as it shifts, knock the conical hub 13 free from the drum 15. This will permit the gear 7 to revolve freely and allow the teeth 25 to mesh with the teeth 14.

The cone angle of the bushing 12 and the member 8 is made great enough so that it will always be free releasing and have no tendency to stick whereas the cone angle of the hub 13 and bushing 18 is made so that it is on the border line of sticking and it will have a slight tendency to stick, perhaps a sufficient amount to continue to drive the gear 7 after the thrust pressure is removed, so when the plunger ball releases from the beveled surface 40 the returning of the yoke to neutral position will draw the drum and gear together, releasing the conical surface of the bushing 12 and member 8, so that the gear can be knocked free from the drum as previously described. It will be evident that when the teeth 25 of the coupling member 24 are in mesh with the internal teeth 14 of the gear 7 that a positive drive will be established between the gear 7 and the shaft 10, which drive corresponds to "second gear" in the transmission.

The synchronizing and shifting into "high gear" is accomplished in the same manner as just described for "second gear". The coupling member will be shifted to the right of Fig. 1 and the teeth 26 thereof will mesh with the internal teeth 21 of the hub 20 so that the shaft 3 will be coupled direct to the shaft 10 to turn together. When going into "high gear" the speed of the gear 2 is synchronized with the speed of the coupling member 24 by the conical surface 23 of the drum 22 engaging with the cone surface of the extension 20 formed on the gear 2 The engagement of the cone surfaces will be broken as the drum 22 is drawn away from the gear by the thrust member 31 returning to neutral position, the thrust member drawing upon the flange 19 of the drum.

The two plungers 35 are provided in the yoke 29 so that at all times the one which is next to be operated will be in its raised position against the shifter rod 38. This makes it impossible when coming out of either speed, "second" or "high" to pass through neutral position without rocking the yoke and thus synchronizing for the other speed. In other words it is impossible to "run by" the synchronizing connection which would be likely to happen if only one plunger was provided as it would have to drop into a notch at the neutral position. Furthermore, the dash pot feature could not be used with a single plunger as it would not have time to become charged during the short interval of time it would be in a raised position while passing through neutral position. By having the two plungers, as before stated, the one which is next to operate is always in the raised position and charged with the transmission oil ready for operation.

In Fig. 7 of the drawings I have illustrated a slightly modified form of the invention wherein a friction member 61 is positioned between the gears 2 and 7. This friction member 61 has the opposite conical friction surfaces 62 and 63 to mate respectively with the friction surfaces of the hub 13 and the hub 20. The friction member has the internal teeth 64 which are always in mesh with the teeth 65 of the slidable coupling member 66. This establishes a drive between the shaft 10 and the friction member. The friction member 61 will be operated from the yoke 29 and when shifted to the left of the position shown in Fig. 7 will synchronize the gear 7 for second speed and when shifted to the right will synchronize the gear 2 for high speed. The thrust block 31a used in connection with the friction member 61 will be received in the groove 67 formed in the outer face of the friction member. The teeth 65 of the coupling member 66 are of sufficient length that when they are shifted into engagement with either the teeth of the gear 7 or the gear 2 that they will still be in mesh with the internal teeth 64 of the member 61. The shifting of the coupling member 66 is accomplished by means of sliding bars 68 which slide in the recesses in the spline shaft 10. These bars have the projections 69 which engage in the recess 70 formed in the coupling member and the connecting ring 71 on the outer ends which is notched to receive the end of the shifter fork 28a secured to the shifter rod 38 at 39.

Having fully described my invention what I claim as new and desire to secure by Letters Patent is:

1. A power transmission including power transmission elements one of which is shiftable relative to the other, means for synchronizing the speeds of the elements, a swinging member adapted to operate the synchronizing means, a shifter rod adapted to operate the shiftable element and swinging member, and a pair of slidable plungers carried by the swinging member and engageable with the shifter rod at spaced points.

2. A power transmission including power transmission elements one of which is shiftable relative to the other, means for synchronizing the speeds of the elements, a swinging member adapted to operate the synchronizing means, a shifter rod adapted to operate the shiftable element and swinging member, and a pair of spring controlled slidable plungers carried by the swinging member and engageable with the shifter rod at spaced points.

3. A power transmission including power transmission elements one of which is shiftable relative to the other, means for synchronizing the speeds of the elements, a swinging member adapted to operate the synchronizing means, a shifter rod adapted to operate the shiftable element and swinging member, an enlargement formed on the shifter rod, and a pair of plungers carried by the swinging member and engageable on opposite sides of the enlargement on the shifter rod.

4. A power transmission including a shaft, a gear normally freely rotatable on the shaft, a shiftable power transmission element for connecting the free gear to the shaft, means for shifting the power transmission element, a friction device associated with the free gear for synchronizing its speed with the shiftable power transmission element, a flange formed on the friction device, a swinging member, a thrust block pivotally connected to the swinging member, said thrust block being formed and adapted to receive the flange of the friction device, and means for operating the swinging member for engaging and releasing the friction device.

5. In combination with a power transmission including a shaft, a pair of longitudinally spaced gears normally freely rotatable on the shaft, a shiftable power transmission element for connecting either of the free gears to the shaft, and means for shifting the power transmission element, of means for synchronizing the speed of the normally freely rotatable gears with the speed of the shiftable power transmission element, said synchronizing means including a cone friction device associated with each of the free gears, a single yoke mounted for swinging movement in opposite directions for operating either of the friction devices, yieldable members carried by the yoke, means engageable with the yieldable members for limiting the swinging movement of the yoke in either direction, and means for operating the yoke.

6. In combination with a power transmission including a shaft, a pair of longitudinally spaced gears normally freely rotatable on the shaft, a shiftable power transmission element for connecting either of the free gears to the shaft, and means for shifting the power transmission element, of means for synchronizing the speed of the normally freely rotatable gears with the speed of the shiftable power transmission element, said synchronizing means including a cone friction device associated with each of the free gears, a single yoke mounted for swinging movement in opposite directions for operating either of the friction devices, yieldable members carried by the yoke, means engageable with the yieldable members for limiting the swinging movement of the yoke in either direction and for returning the yoke to its normal position, and means for operating the yoke.

7. In combination with a power transmission including a shaft, a pair of longitudinally spaced gears normally freely rotatable on the shaft, a shiftable power transmission element for connecting either of the free gears to the shaft, and means for shifting the power transmission element, of means for synchronizing the speed of the normally freely rotatable gears with the speed of the shiftable power transmission element, said synchronizing means including a cone friction device associated with each of the free gears, a single yoke mounted for swinging movement in opposite directions for operating either of the friction devices, an extension formed on the yoke and provided with a recess, yieldable members received in the recess, means extending into the recess and engageable with the yieldable members for limiting the swinging movement of the yoke in either direction and for returning the yoke to its normal position, and means for operating the yoke.

8. In combination with a power transmission including a shaft, a pair of longitudinally spaced gears normally freely rotatable on the shaft, a shiftable power transmission element for connecting either of the free gears to the shaft, and means for shifting the power transmission element, of means for synchronizing the speed of the normally freely rotatable gears with the speed of the shiftable power transmission element, said synchronizing means including a cone friction device associated with each of the free gears, a single yoke mounted for swinging movement in opposite directions for operating either of the friction devices, an extension formed on the yoke and provided with a recess, yieldable members received in the recess, a pin extending into the recess and engageable with the yieldable members for limiting the movement of the yoke in either direction and for returning the yoke to its normal position, and means for operating the yoke.

9. A power transmission including a shaft, a gear rotatable with respect to the shaft and having clutch teeth and a friction clutch surface, a shiftable power transmission element having clutch teeth for connecting the gear to the shaft and having a longitudinal groove formed therein, a friction device keyed directly to the shaft between the gear and the shiftable element for synchronizing the speeds of said gear and said shiftable element, said friction device being formed with an opening and an inwardly extending projection adapted to be received in the groove of the shiftable element to permit shifting of the shiftable element through the opening in the friction device and into driving engagement with the gear, and a single operating means for shifting the shiftable element and engaging and releasing the friction device.

10. In power transmission mechanism the combination of a pair of toothed power transmitting elements one of which is slidable into and out of interlocking engagement with its companion, friction devices for synchronizing the speeds of said toothed power transmitting elements, one of said devices being movable into and out of engagement with its companion; means for operating the slidable toothed element and the movable friction device comprising a manually controllable lever, two spring pressed plungers spaced one from the other, mechanically connected to the movable friction device to move in unison therewith, and a device mechanically connected with the slidable toothed element arranged to engage between the plungers and to depress one or the other of said plungers upon the application of a predetermined amount of force to said device.

11. The combination defined in claim 10 in which fluid friction brake mechanism is arranged to resist the retraction of the plungers.

12. In power transmission mechanism, two coaxial power transmission members adapted to be coupled or uncoupled, one of said members having gear like clutch teeth and a friction clutch element provided with a friction zone radially external of the clutch teeth; a toothed clutch element and a friction clutch element in driving engagement with the other power transmission member, said last named toothed clutch and friction clutch elements being axially movable into and out of engagement with their companions; said axially movable friction clutch element consisting of a disk having angularly spaced openings therethrough interposed between the axially movable toothed clutch element and said gear like clutch teeth; said axially movable toothed clutch element having angularly spaced groups of teeth arranged to pass thru the openings of the friction clutch disk and interlock with the gear like teeth of its companion.

13. In power transmission mechanism, a composite clutch comprising a jaw clutch element having an internal annular row of gear like teeth and a friction clutch element having a conical friction surface external of and surrounding the row of teeth; an axially movable jaw clutch element having angularly spaced groups of teeth adapted to interlock with the gear like teeth of its companion, an axially movable friction clutch disk having a flange provided with a conical friction surface adapted to engage the conical surface of its companion; said disk being disposed between the annular row of gear like teeth and the axially movable jaw clutch element and having angularly spaced openings to permit passage of the groups of teeth on the axially movable jaw clutch element.

14. In a device of the class described, the combination of a shaft, a power gear loose on the shaft and provided on one side with a ring-like extension having internal teeth on its inner periphery and a bevel face on its outer periphery constituting the male element of a conical friction clutch, synchronizing mechanism for causing the gear and shaft to approach the same speed, said mechanism including a light ring, shiftable axially of and turning with the shaft and including a hub like part positioned between the shaft and the internal gear teeth, an outwardly extending part and a flange overlapping the male element, said flange having its inner face beveled and constituting the female element of the friction clutch, said outwardly extending part provided with an opening extending therethrough, a shift member splined to the shaft and having a peripheral groove, a shift finger engaging in said groove, said shift member provided on the side of the slot adjacent the light ring with teeth adapted to pass through the opening in the ring and into mesh with the internal teeth to provide a positive drive between the power gear and the shaft, through said shift member.

15. In a device of the class described, the combination of a shaft, a gear loosely mounted for rotary movement on the shaft and provided on one side with clutch teeth spaced radially from the shaft, and a bevel face forming an element of a friction clutch of the cone type, a one piece member keyed directly to the shaft and provided on one side with teeth, and adapted to engage the teeth on the gear to provide a positive clutch drive between the shaft and gear and provided with a peripheral groove, and synchronizing means between the gear and slide member for causing the gear and shaft to approach the same speed, said synchronizing means including a synchronizer turning with the shaft and providing the coacting element of the friction clutch and said synchronizer provided with an opening positioned to permit the passage therethrough of the teeth on the slide member in their movement into and from their engagement with the teeth on the gear and a single control having a fork engaging in the groove in said slide member to cause the same to slide to and from its positive clutch driving position and means to cause the synchronizing means to function prior to the interengagement of the teeth.

16. In a device of the class described, the combination of a shaft, a power transmitting member rotatable about the axis of the shaft, said power transmitting member having an axially extending ring-like portion provided with a conoidal friction surface on its external periphery and with internal gear-like teeth on its inner periphery; a toothed clutch member slidably keyed to the shaft, said toothed clutch member having external gear-like clutch teeth arranged to interlock with the gear-like clutch teeth on said power transmitting member; an axially movable disk-like friction clutch member coaxial with the shaft interposed between the clutch teeth on said power transmitting member and on said slidable toothed clutch member, said axially movable disk-like friction clutch member being mounted so as to rotate with said shaft and to be axially movable with respect thereto and having an opening alined with the clutch teeth and a conoidal friction surface arranged to cooperate with the conoidal friction surface on said power transmitting member, and means to move the axially movable friction clutch member and the slidably movable toothed clutch member toward their companions and for releasing the friction clutch members prior to the interengagement of the teeth of the toothed clutch members.

17. In a device of the class described, the combination of two rotative members consisting of a shaft and a power transmitting member rotatable about the axis of the shaft, said power transmitting member having clutch teeth and a conoidal friction surface thereon; an axially movable friction clutch member driven by the shaft having a conoidal friction surface engageable with the conoidal friction surface on the power transmitting member and having an opening therethrough registering with the clutch teeth; an axially movable shift member splined to the shaft and provided with teeth arranged in position to pass through the opening in the axially movable friction clutch member to engage the teeth on said power transmitting member; and means for moving the axially movable shift member and the axially movable friction clutch member toward their companions and for releasing the friction clutch members prior to engagement of the teeth of the toothed clutch members.

18. In a device of the class described, a shaft, a power transmitting member loose on the shaft, said power transmitting member provided with a ring-like extension on one face thereof having internal teeth on its inner periphery and an external conoidal friction surface in its outer periphery; a jaw clutch member slidably keyed to the shaft and provided with spaced teeth constructed and arranged to intermesh with the internal teeth on the power transmitting member; a disk-like member between the power member and the slidable jaw clutch member, said disk-like member being rotatable with said shaft and movable axially with respect thereto, said disk-like member comprising a hub like part disposed between the shaft and the internal teeth of the power member, a web having an opening therethrough shaped and disposed in position to permit passage of the teeth of the slidable jaw clutch member and a flange provided with an internal conical friction surface proportioned and arranged to coact with the friction surface on the power transmitting member, means for shifting axially the disk-like member and the slidable jaw clutch member comprising connecting means movable initially in unison with the axial movement of said jaw clutch member while approaching its companion.

19. In a device of the class described, a shaft, a power transmitting member, normally freely rotatable on the shaft, provided on one face with an annular row of clutch teeth radially spaced from the shaft, and a conoidal friction surface, a jaw clutch member slidably keyed to the shaft and provided with clutch teeth constructed and arranged to interlock with the clutch teeth on the power transmitting member; a disk-like friction clutch member disposed between the power transmitting member and the slidable jaw clutch member in driving connection with the shaft and axially movable with respect thereto, said disk-like member having a conoidal friction surface arranged to cooperate with the friction surface on the power transmitting member, and an opening through the disk-like member in position to permit passage therethrough of teeth on the slidable jaw clutch member; means for shifting axially the disk-like member comprising connecting means movable initially in unison with the axial movement of the jaw clutch member and yieldable means for releasing connection between the disk-like member and said connecting means in response to resistance of the friction surface of said power transmitting member to further movement of the axially movable disk-like member.

20. In power transmission mechanism the combination of two jaw clutch elements respectively provided with internal and external gear-like clutch teeth one of said jaw clutch elements being movable axially into and out of interlocking engagement with its companion; two friction clutch elements one of which is movable axially into and out of engagement with its companion; said axially movable clutch elements being disposed concentrically one within the other and slidably keyed one to the other by means of the gear-like teeth of the jaw clutch element; means for effecting torque transmitting engagement of the friction clutch elements and thereafter torque transmitting engagement of the jaw clutch elements, said means including a manually controllable lever and connections between said axially movable clutch elements comprising a spring pressed latch adapted to be released by force exerted through the lever opposed by the engagement of the friction clutch elements and a fluid friction brake arranged to resist release of the spring pressed latch.

21. In power transmission mechanism the combination of two jaw clutch elements, one of said jaw clutch elements being slidable into and out of interlocking engagement with its companion, two friction clutch elements, one of which is movable axially into and out of frictional driving engagement with its companion, said axially movable jaw and friction clutch elements being disposed concentrically one within the other and slidably keyed one to the other; means for effecting torque transmitting engagement of the friction clutch elements and thereafter torque transmitting engagement of the jaw clutch elements, said means including a manually controllable lever and connections between said axially movable clutch elements comprising a cam member normally disposed between axially spaced spring pressed latches adapted to be released by force exerted through the lever opposed by the engagement of the friction clutch elements.

22. In power transmission mechanism, a composite clutch consisting of two jaw clutch elements respectively provided with internal and external gear-like clutch teeth, one of said jaw clutch elements being movable axially into and out of inter-locking engagement with its companion, and two friction clutch elements one of which is movable axially into and out of engagement with its companion, said axially movable clutch elements being disposed concentrically one within the other and slidably keyed one to the other; means for effecting torque transmitting engagement of the friction clutch elements and thereafter interlocking engagement of the jaw clutch elements, said means including a shifter element engaging the axially movable jaw clutch element, means for releasably latching the movable friction clutch element to said movable jaw clutch element consisting of spaced spring pressed plungers connected to one of said elements to move in unison therewith and a member having beveled edges connected to the other element to move in unison with the latter, said member with beveled edges being disposed between said spaced plungers so that the beveled edges are normally in engagement with the ends of the plungers.

EARL A. THOMPSON.